United States Patent
Becker et al.

(10) Patent No.: US 12,442,174 B2
(45) Date of Patent: Oct. 14, 2025

(54) METHOD FOR OPERATING A WASTEWATER-LIFTING SYSTEM

(71) Applicant: KSB SE & Co. KGaA, Frankenthal (DE)

(72) Inventors: Michael Becker, Frankenthal (DE); Juergen Geinitz, Frankenthal (DE); Thomas Pensler, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 802 days.

(21) Appl. No.: 17/053,457

(22) PCT Filed: May 7, 2019

(86) PCT No.: PCT/EP2019/061664
§ 371 (c)(1),
(2) Date: Nov. 6, 2020

(87) PCT Pub. No.: WO2019/215138
PCT Pub. Date: Nov. 14, 2019

(65) Prior Publication Data
US 2021/0246646 A1 Aug. 12, 2021

(30) Foreign Application Priority Data
May 9, 2018 (DE) ..................... 10 2018 207 257.4

(51) Int. Cl.
*E03F 5/22* (2006.01)
*E03F 5/10* (2006.01)
(Continued)

(52) U.S. Cl.
CPC .................. *E03F 5/22* (2013.01); *E03F 5/14* (2013.01); *E03F 5/10* (2013.01); *F04D 15/029* (2013.01)

(58) Field of Classification Search
None
See application file for complete search history.

(56) References Cited

U.S. PATENT DOCUMENTS

| | | | |
|---|---|---|---|
| 2,029,765 A * | 2/1936 | Durdin, Jr. | .......... F04D 15/0218 137/414 |
| 3,015,279 A | 1/1962 | Nechine | |
| 2008/0083464 A1* | 4/2008 | Shimizu | ................ F16K 1/2007 137/527 |

FOREIGN PATENT DOCUMENTS

| | | |
|---|---|---|
| DE | 33 33 883 A1 | 3/1985 |
| DE | 36 07 353 C2 | 10/1991 |

(Continued)

OTHER PUBLICATIONS

"Machine Translation of DE19543123", Hasse et al., published 1997, 11 total pages. (Year: 1997).*

(Continued)

*Primary Examiner* — Jonathan M Peo
(74) *Attorney, Agent, or Firm* — Crowell & Moring LLP

(57) ABSTRACT

A wastewater-lifting system and a method for operating a wastewater-lifting system guides wastewater loaded with bulky materials into a bulky material collection tank having at least one separating screen. During intake of wastewater, the bulky materials are retained in the bulky material collection tank and pre-cleaned wastewater passes into a liquid collection tank via a connection line and one or both of a pump and a bypass line connected to the connection line. During the wastewater intake a pivoting flap in the connection line closes flow to the pump except for a flushing cross section, and opens the bypass line. During a pumping operation, the pivoting flap opens the connection line from the pump and closes the bypass line.

19 Claims, 4 Drawing Sheets

(51) Int. Cl.
*E03F 5/14* (2006.01)
*F04D 15/02* (2006.01)

(56) References Cited

FOREIGN PATENT DOCUMENTS

| | | |
|---|---|---|
| DE | 195 43 123 C1 | 5/1997 |
| EP | 1 108 822 A1 | 6/2001 |
| EP | 1 108 822 B1 | 10/2002 |
| EP | 2 581 508 B1 | 3/2014 |
| EP | 3 130 710 A1 | 2/2017 |
| FR | 752 942 A | 10/1933 |

OTHER PUBLICATIONS

"Machine Translation of FR752942", Pompes et Compresseurs Baudot-Hardoll, published 1933, 10 total pages. (Year: 1933).*
"Machine Translation of FR2946062", Pigois, published 2010, 22 total pages. (Year: 2010).*
International Search Report (PCT/ISA/210) issued in PCT Application No. PCT/EP2019/061664 dated Aug. 6, 2019 with English translation (five (5) pages).
German-language Written Opinion (PCT/ISA/237) issued in PCT Application No. PCT/EP2019/061664 dated Aug. 6, 2019 (six (6) pages).
German-language Search Report issued in German Application No. 10 2018 207 257.4 dated Feb. 13, 2019 with partial English translation (17 pages).

* cited by examiner

METHOD FOR OPERATING A WASTEWATER-LIFTING SYSTEM

CROSS REFERENCE TO RELATED APPLICATIONS

This application is a national phase of PCT International Application No. PCT/EP2019/061664, filed May 7, 2019, which claims priority under 35 U.S.C. § 119 from German Patent Application No. 10 2018 207 257.4, filed May 9, 2018, the entire disclosures of which are herein expressly incorporated by reference.

BACKGROUND AND SUMMARY OF THE INVENTION

The invention relates to a method for operating a wastewater-lifting system, according to which wastewater laden with bulky materials is guided through a bulky material-collecting tank which has at least one separating screen arranged in its interior, furthermore according to which, during the intake of wastewater, the bulky materials are retained in the bulky material-collecting tank and pre-cleaned wastewater is fed via a connecting line to a pump and finally to a liquid-collecting tank, and according to which the pre-cleaned wastewater passes via the pump, on the one hand, and via a bypass line connected to the connecting line, on the other hand, into the liquid-collecting tank.

Wastewater-lifting systems are generally used for lifting inflowing wastewater to a specific level, for example for the purpose of further treatment in a wastewater-cleaning system. Since the wastewater is laden with bulky materials or solids of varying size, use was firstly made in the past of large pumps, which in terms of costs and efficiency, however, are not satisfactory. For this reason, the bulky material-collecting tank, which is connected before the pump, ensures during the intake of wastewater that the bulky materials are retained in its interior with the aid of the separating screen. In this way, only pre-cleaned wastewater passes to the pump and is stored in the liquid-collecting tank.

During the lifting of wastewater or a pumping process following the intake of wastewater, the pre-cleaned wastewater is forced through the bulky material-collecting tank from the liquid-collecting tank with the aid of the pump. In this process, the solids initially retained with the aid of the separating screen are detached from the latter and transported away via a pressure line. The fundamental method of operation of such a wastewater-lifting system is described in EP 1 108 822 B1.

In the generic prior art according to EP 2 581 508 B1, first of all a filter device is provided outside the liquid-collecting tank. The filter device is arranged in a filter box, provided with a closable opening, before the pump. Moreover, a filling bypass by way of which the liquid-collecting tank can be filled is connected to the filter box. In addition, the pre-cleaned wastewater passes into the liquid-collecting tank via the pump.

During the filling of the liquid-collecting tank, that is to say during the intake of wastewater, the filling bypass is open. By contrast, the filling bypass is blocked during the emptying of the liquid-collecting tank, that is to say during the pumping process. For this purpose, the known filling bypass is in the form of a funnel at its upper end, which upper end opens into the filter box. Also here, a shut-off element, by way of which the filling bypass is opened during the filling of the liquid-collecting tank and is shut off during the emptying of the liquid-collecting tank, can be found. The shut-off element is a light, floatable ball, which, owing to its buoyancy, bears against a boundary at the upper end of the funnel.

Such a ball as a shut-off element is disadvantageous insofar as relatively small solids or bulky materials situated in an unchanged manner in the pre-cleaned wastewater, for example, can lead to problems during the closing process. Moreover, cakings, limescale deposits, etc., which likewise cast doubt on the functional capability, are often observed. If, in the context of EP 1 108 822 B1, a bypass there in the form of a discharge line parallel to the connecting line is also used, a shut-off element is already lacking.

A bypass line with an associated shut-off element is also broadly described in FR 752 942. In this case, the bypass line is connected, before an associated pump, to the connecting line to the liquid-collecting tank. Moreover, a shut-off flap is provided in the bypass line.

The invention is based on the technical problem of further developing a method of said type for operating a wastewater-lifting system such that, with account taken of a structurally simple design, functionally reliable operation is ensured.

To solve said technical problem, a generic method for operating a wastewater-lifting system in the context of the invention is characterized in that provision is made in the connecting line of a pivoting flap, which, during the intake of wastewater, closes the connecting line except for a flushing cross section and opens the bypass line and which, during the pumping process, opens the connecting line and closes the bypass line. The invention also relates to a correspondingly configured wastewater-lifting system, as is described in claim 10 ff.

Therefore, in the context of the invention, first of all use is made of a bypass line which is connected to the connecting line between the bulky material-collecting tank and the pump and which, by contrast to the teaching according to FR 752 942, is not connected before the pump. To this extent, a topology comparable with the generic prior art according to EP 2 581 508 B1 is realized. By contrast to this, however, the invention does not provide a separate filter box, as it were, in the connecting line. Rather, according to the invention, the filter box or the separating screen can be found in the interior of the bulky material-collecting tank.

Moreover, in this context, according to the invention, the configuration may be such that the separating screen can, via a closable opening in the bulky material-collecting tank, optionally be inserted into the bulky material-collecting tank and removed therefrom again, for example for cleaning purposes or for the purpose of exchange. If, furthermore, the bulky material-collecting tank and the pump are then also arranged outside the liquid-collecting tank, a wastewater-lifting system which, altogether, is easy to clean and to maintain is provided.

By contrast to the generic prior art according to EP 2 581 508 B1, the invention uses a pivoting flap in the connecting line as a shut-off element. During the feeding of wastewater or during the intake of wastewater, the pivoting flap closes the connecting line not completely, but rather except for a flushing cross section. That is to say, the flushing cross section is generally defined at the edge of the pivoting flap, and is automatically established by a spacing between the (closed) pivoting flap, at one side, and an inner wall of the connecting line in this region, at the other side. Said flushing cross section firstly ensures that the pivoting flap, at least during the intake of wastewater, is flushed around at the edge, with the result that it is practically impossible for cakings, limescale deposits, etc. to remain adhering at this position. Secondly, via the flushing cross section, a small fraction of the wastewater flow flowing in altogether during the intake of wastewater is guided through the pump, which is connected to the connecting line. As a result, the pump is also flushed with the aid of the pre-cleaned wastewater, which is guided therethrough during the intake of wastewater. The same applies to a feed line coupling the pump to the bulky material-collecting container.

By contrast, the pivoting flap in the connecting line, which closes the connecting line except for the flushing cross section during the intake of wastewater, ensures that the main fraction of the wastewater flow is transferred directly, while bypassing the pump, into the liquid-collecting tank via the bypass line. In this way, the wastewater flow associated with the wastewater intake can, altogether and according to the invention, be significantly increased in comparison with the prior art, for example according to EP 1 108 822 B1, because here the entire wastewater flow must be guided through the pump there until it reaches the liquid-collecting tank. Also, in comparison with the generic prior art according to EP 2 581 508 B1, an increase of the wastewater flow during the intake of wastewater is possible because, in this case, the ball used leaves free an annular space through which there project sheet-metal bars which act as a delimitation for the ball. By contrast to this, the flushing cross section in the invention between the outer edge of the pivoting flap and the inner wall of the connecting line is completely free of fixtures in this region with the pivoting flap closed, and so the flushing flow guided through the flushing cross section can flow unhindered into the pump and through the pump as far as the liquid-collecting tank. Also, any impurities still present in the pre-cleaned wastewater cannot become stuck in the flushing cross section.

Within the context of the invention, it is moreover and advantageously the case that the configuration is such that the above-described wastewater flow associated with the wastewater intake and a pump flow associated with the pumping process are substantially equal in size. This dimensioning rule means that, between the wastewater flow and the pump flow, for example, a difference in volume within a specific period of time that is less than 20% is observed.

This means that, for example, the wastewater flow associated with the wastewater intake may amount to 10 l/s. In this case, a pump flow of approximately 11-12 l/s is observed, and so the wastewater flow and the pump flow are substantially equal in size if, hereby, differences in volume within the specific period of time, one second in the present case, of less than 20% are applied as the criterion. This is because, in the example stated above, the difference in volume is at most 20% (12 l/s in relation to 10 l/s). In order to ensure this configuration, the starting point is generally a particular and specific pump. In this way, the pump flow is more or less fixed and, in terms of the delivered pumped quantity, is slightly larger than the wastewater flow, as described.

The wastewater flow, which is to be substantially equal in size, can, by way of the geometrical configuration of the connecting line, as well as of the bypass line, in conjunction with the pivoting flap and the flushing flow consequently specified, then be set up such that, in comparison with the pump flow, only a difference in volume of less than 20% is observed. This dimensioning rule ensures that pressure fluctuations or "surges" within the liquid-collecting tank, which have frequently been observable to date in the prior art and in practice, are almost completely avoided.

In fact, the configuration is normally such that the wastewater-lifting system according to the invention is equipped with two bulky material-collecting tanks and two associated pumps, which are in each case connected to the liquid-collecting tank. During the intake of wastewater, the pre-cleaned wastewater, as a rule, then flows through one of the two pumps, while the other pump performs a pumping process. Since, during this process, the wastewater flow and the pump flow are substantially equal in size according to the invention, specifically with account taken of the above-stated criteria, a liquid level within the liquid-collecting tank remains substantially the same or undergoes only slight variations.

As a consequence of this, it is also the case altogether that smooth transitions between the wastewater intake and the pumping process are observed and pressure peaks within the liquid-collecting tank are avoided. Such pressure peaks are disadvantageous, in particular with regard to a long service life, because as a consequence all the mechanical connections, such as flange connections, welded connections, etc., are particularly stressed and in extreme cases can even crack or at least become brittle. Within the context of the invention, this is specifically countered in that the wastewater flow and the pump flow are substantially equal in size and consequently the two pumps are generally (able to be) operated alternately.

To be regarded as a further advantage is that the pivoting flap is connected to a flange of the bypass line, and/or to a flange of the connecting line, and/or to a flange of a flap connector, via a foot-side joint. As a rule, the pivoting flap is connected to the flange of the flap connector. In this way, the flap connector in question may advantageously be inserted as a 3-way connector into the connecting line. Moreover, it is consequently possible, via a branch of the flap connector, for the bypass line to be connected and to be coupled to the branch.

The flap connector, including the pivoting flap situated therein, advantageously works in the manner of a 3-way valve. During the intake of wastewater, the pivoting flap ensures that the connecting line is closed except for the flushing cross section. The bypass line is open. By contrast, during the pumping process, the connecting line is opened (completely) and the bypass line is closed (completely). The flushing flow discussed above is therefore observed only during the intake of wastewater, when the pivoting flap closes the connecting line except for the flushing cross section-that is to say not completely.

In order to realize this functionality of the pivoting flap in detail, as a rule, the pivoting flap is inclined in the connecting line during the intake of wastewater. During the intake of wastewater, the inclination of the pivoting flap generally amounts to approximately 10° to 30° in relation to a horizontal. That is to say, the inclined pivoting flap includes an angle in the range from approximately 10° to 30° with the horizontal. As a result of the inclination, the above-discussed flushing cross section between the edge of the (closed) pivoting flap and the inner wall of the connecting line or the inner wall of the flap connector is automatically provided. Moreover, the inclination ensures that, during a subsequent pumping process, the pivoting flap can pivot open immediately and no caking due to deposits are observed. This is because the pivoting flap is generally limited in terms of its inclination with the aid of at least one stop. The stop is generally provided in the interior of the flap connector or generally within the connecting line. It goes without saying that the stop is configured such that the flushing cross section during the intake of wastewater and in the closed position of the pivoting flap, which has already been discussed several times, remains as before.

In order to realize the flushing cross section in detail, the connecting line has in the region of the pivoting flap, in the state closed during the intake of wastewater, a bulged portion which specifies the flushing cross section. Since the pivoting flap is generally arranged in the interior of the flap connector, the flap connector in question is normally provided in the region of the pivoting flap, in the state closed during the intake of wastewater, with the bulged portion specifying the flushing cross section. In one way or another, the flap connector, including the pivoting flap situated therein, generally works in the manner of a 3-way valve, as has already been described in detail above.

Consequently, a description is given of a method for operating a wastewater-lifting system that provides functionally reliable operation even over long time scales, with account taken of a compact and inexpensive design. This is because the bypass line realized ensures that the wastewater intake takes place particularly quickly and efficiently. Here, the pivoting flap is closed. Since the flushing cross section remains when the closing process is realized, the shut-off flap is flowed around and the pump situated therebehind in the inflow direction as well as a feed line to the liquid-collecting tank are flushed through at the same time. As a result of the inclination, during a subsequent pumping process, the pivoting flap can, by way of the pre-cleaned wastewater flowing against it and delivered with the aid of the pump, be immediately pivoted such that the connecting line is opened and the bypass line is closed. The main advantages are considered to consist therein.

Other objects, advantages and novel features of the present invention will become apparent from the following detailed description of one or more preferred embodiments when considered in conjunction with the accompanying drawings.

DETAILED DESCRIPTION

Figure 1:
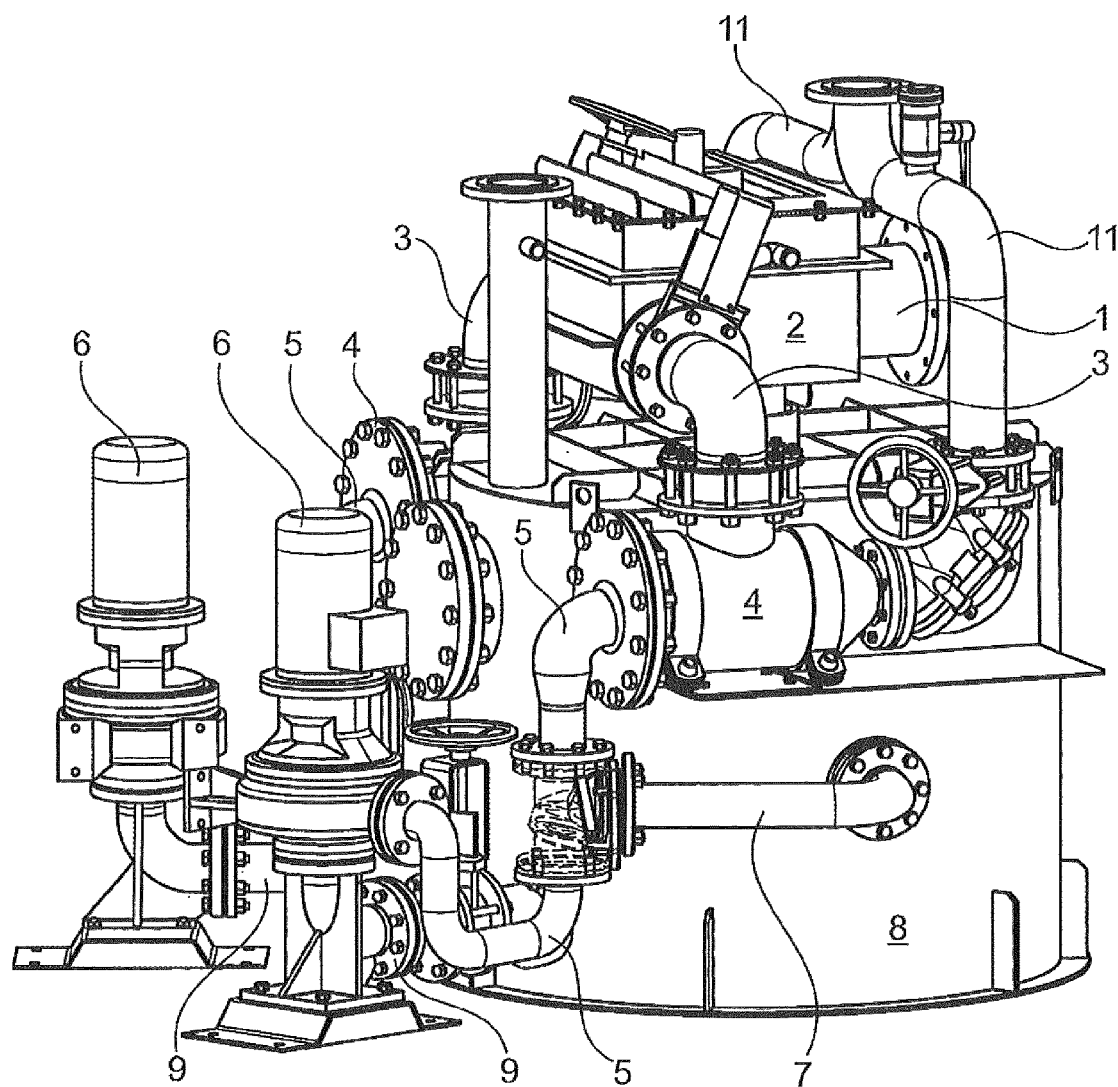
FIG. 1 shows a wastewater-lifting system according to an embodiment of the invention and the operation thereof in an overview.

The figures illustrate a wastewater-lifting system. This first of all has an inflow 1 for wastewater, which, via an inflow distributor 2 and a feed line 3, transfers the wastewater in each case into two bulky material-collecting tanks 4 in the exemplary embodiment. In the context of the exemplary embodiment, the wastewater-lifting system is of symmetrical configuration and has two bulky material-collecting tanks 4 and additionally also two discharge lines or connecting lines 5, via which the wastewater pre-cleaned with the aid of the bulky material-collecting tanks 4 passes into in each case one associated pump 6.

The bulky material-collecting tank 4 or the two bulky material-collecting tanks 4 in each case ensure that the wastewater flowing in altogether via the inflow 1 and the inflow distributor 2 and laden with solids is freed of the bulky materials or solids, which remain in the associated bulky material-collecting tank 4. The wastewater pre-cleaned in this manner then passes into the pump 6 via the discharge line 5 or connecting line, or directly into a liquid-collecting tank 8 via a bypass 7. The pre-cleaned wastewater flowing through the respective pump 6 passes, via a feed line 9, likewise into the liquid-collecting tank 8. The intake of the wastewater corresponds to this.

During a pumping or lifting process, the pre-cleaned wastewater is then sucked in from the liquid-collecting tank 8 via the feed line 9, in each case by the pump 6, and forced through the discharge line or connecting line 5 into the bulky material-collecting tank 4. Here, the pre-cleaned wastewater entrains the solids retained in the bulky material-collecting tank 4 and transfers the wastewater via a pressure line 11 to a further system, or generally for further treatment. In this way, during the subsequent pumping process, the bulky materials are released from the bulky material-collecting tank 4 and flushed practically without resistance into the pressure line 11.

From FIG. 1, it can be seen that both the pump 6 and the respective bulky material-collecting tank 4, in conjunction with the discharge line or connecting line 5, the feed line 9 and finally the bypass line 7, are altogether arranged outside the liquid-collecting tank 8 and are thus easily accessible. This applies in particular to the bulky material-collecting tank 4, which, according to the exemplary embodiment, has a closable opening (not illustrated in more detail in FIG. 1). Via said closable opening, the separating screen (not explicitly illustrated) that is situated in the interior of the bulky material-collecting tank 4 can be removed and reinserted. In this way, for the separating screen, maintenance tasks can be carried out or else an exchange can be realized.

Figure 2:
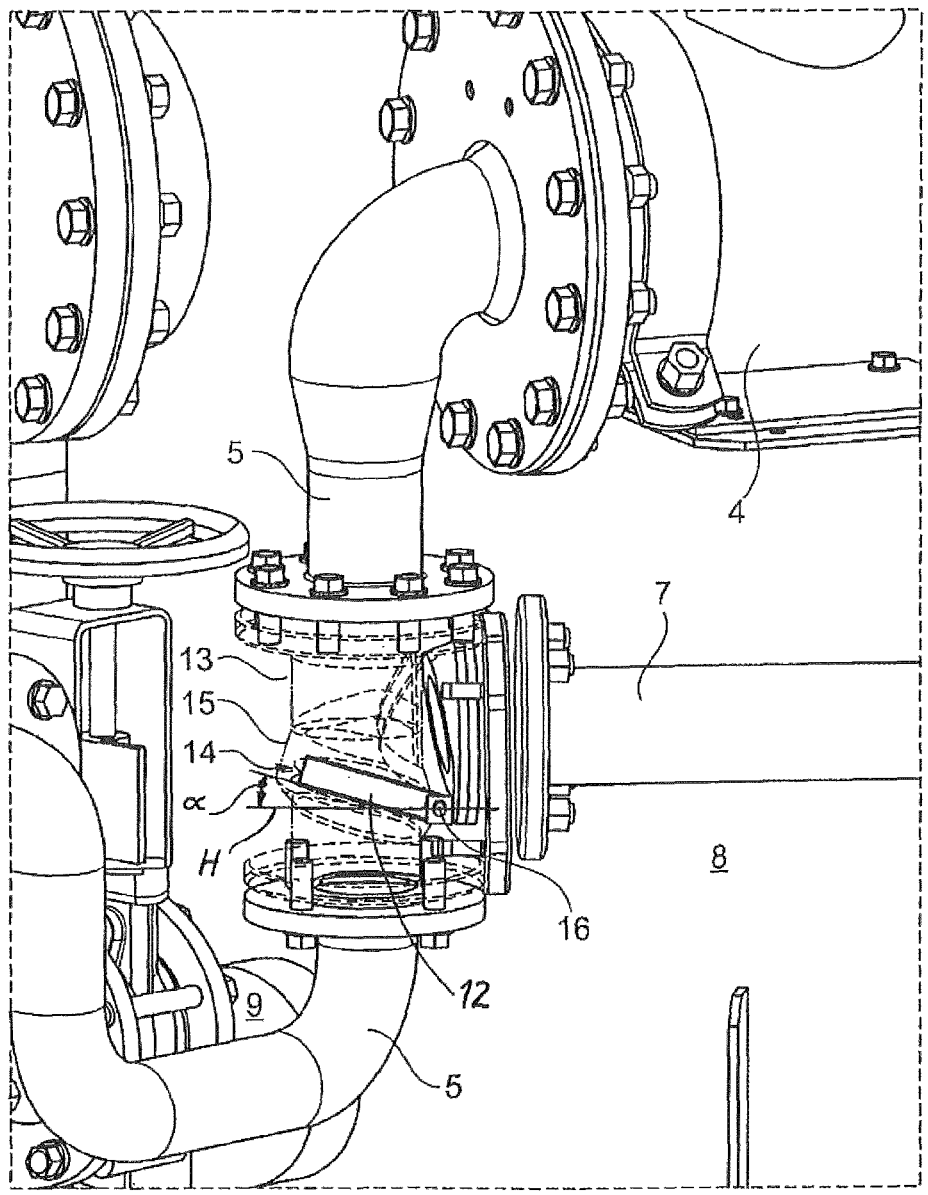
FIG. 2 shows a detail of the system as per FIG. 1 in the region of the flap connector during an intake of wastewater.
Figure 3:
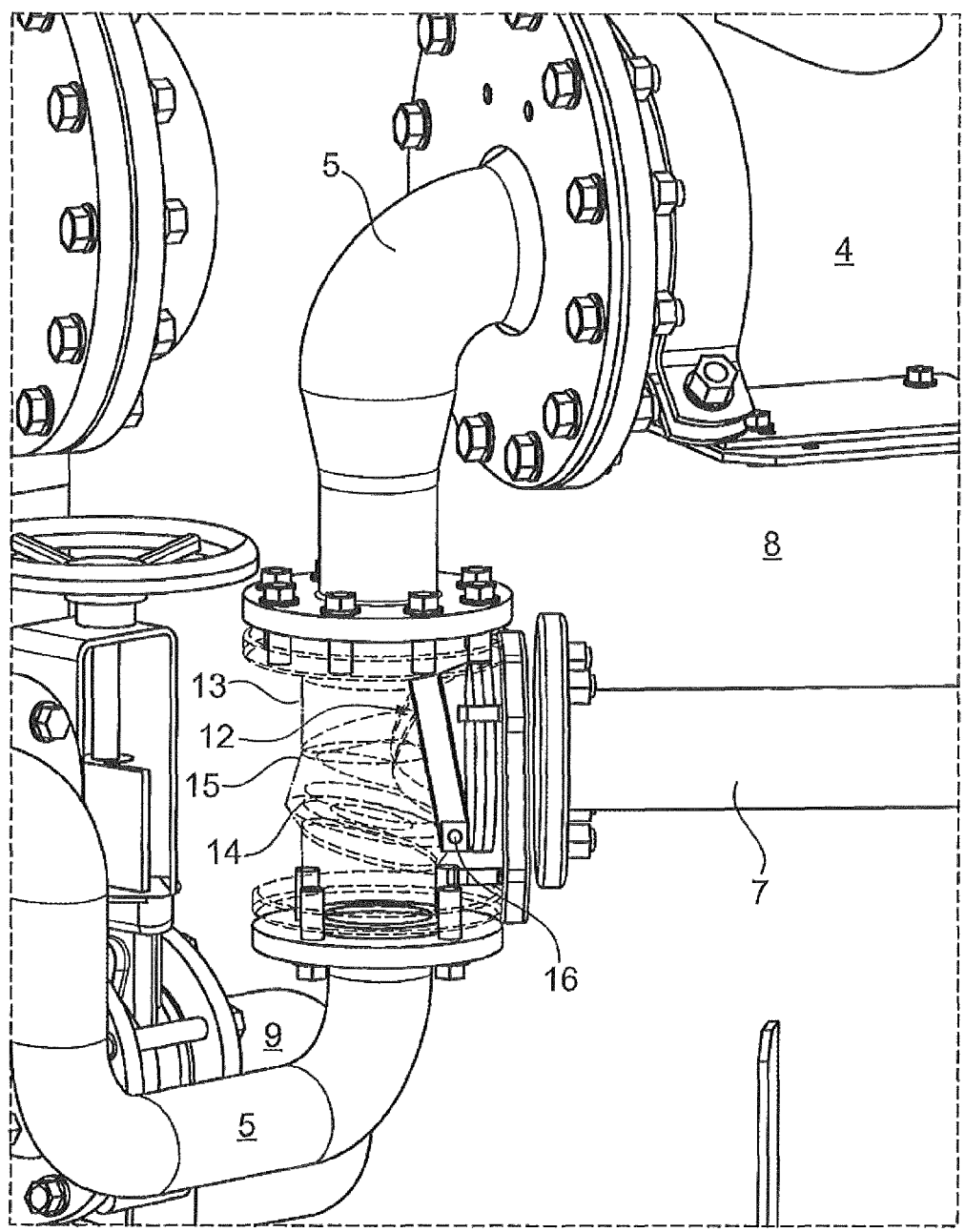
FIG. 3 shows the system as per FIG. 2 during the pumping process.

What is then also essential to the invention is a pivoting flap 12, which can be seen in particular in FIGS. 2 and 3. According to the exemplary embodiment, the pivoting flap 12 is provided in the connecting line 5. In fact, the pivoting flap 12 can be found in the interior of a flap connector 13. The flap connector 13, including the pivoting flap 12 situated therein, works in the manner of a 3-way valve, as will be explained in more detail below. Moreover, the flap connector 13 is inserted as a 3-way connector into the connecting line 5. The flap connector 13 is coupled to the bypass line 7 via a branch.

During the intake of wastewater (illustrated in FIG. 2), the pivoting flap 12 in the connecting line 5 or in the flap connector 13 inserted into the connecting line 5 closes the connecting line 5 except for a flushing cross section 14. Said flushing cross section 14 is established as an annular space or annular cross section in that the pivoting flap 12, in the closed state illustrated in FIG. 2, is spaced apart from the inner wall of the flap connector 13. In fact, the connecting line 5 or the flap connector 13 provided in the connecting line 5 has in the region of the pivoting flap 12, in the state closed during the intake of wastewater, a bulged portion 15 which specifies the flushing cross section 14. That is to say, between the inner wall of the bulged portion 15 and the outer edge of the pivoting flap 12, in the state closed according to the illustration in FIG. 2 and during the intake of wastewater, there is established an arched annular space which altogether specifies and defines the flushing cross section 14.

Consequently, it is possible via the flushing cross section 14 for a specific fraction of the wastewater pre-cleaned with the aid of the bulky material-collecting tank 4 to flow through the pump 6, via the feed line 9 and finally into the liquid-collecting tank 8 during the intake of water according to the illustration in FIG. 2. In this way, both the pump 6 and the feed line 9 and the pivoting flap or shut-off flap 12 are flushed around or flushed free, with the result that, in this case, any residues are removed and the reliable functioning of the shut-off flap 12 is ensured even over long time scales.

During the pumping process according to the illustration in FIG. 3, however, the pre-cleaned wastewater sucked in from the liquid-collecting tank 8 via the feed line 9 with the aid of the pump 6 ensures that the pivoting flap 12 is transferred into the position as per FIG. 3. In this way, the pumping process ensures that the connecting line 5 or the flap connector 13 connected into the connecting line 5 is opened and, by contrast, the bypass line 7, with the aid of the pivoting flap 12, is closed. This is necessary in order that the pre-cleaned wastewater is not returned to the liquid-collecting tank 8 via the bypass line 7, but flows completely through the bulky material-collecting tank 4, during the pumping process. As a consequence of this, the pre-cleaned wastewater can detach the solids retained in the bulky material-collecting tank 4 from the separating screen and flush the wastewater out into the pressure line 11.

The pivoting flap 12 is connected via a foot-side joint 16 to a flange of the flap connector 13 in the exemplary embodiment. Consequently, the flap connector 13 with the pivoting flap 12 arranged in an articulated manner therein can, as a finished installation module, be installed into the connecting line 5 and connected to the bypass line 7 as illustrated. Moreover, the flap connector 13 in question can, according to requirement, be easily removed and for example cleaned.

Figure 4:
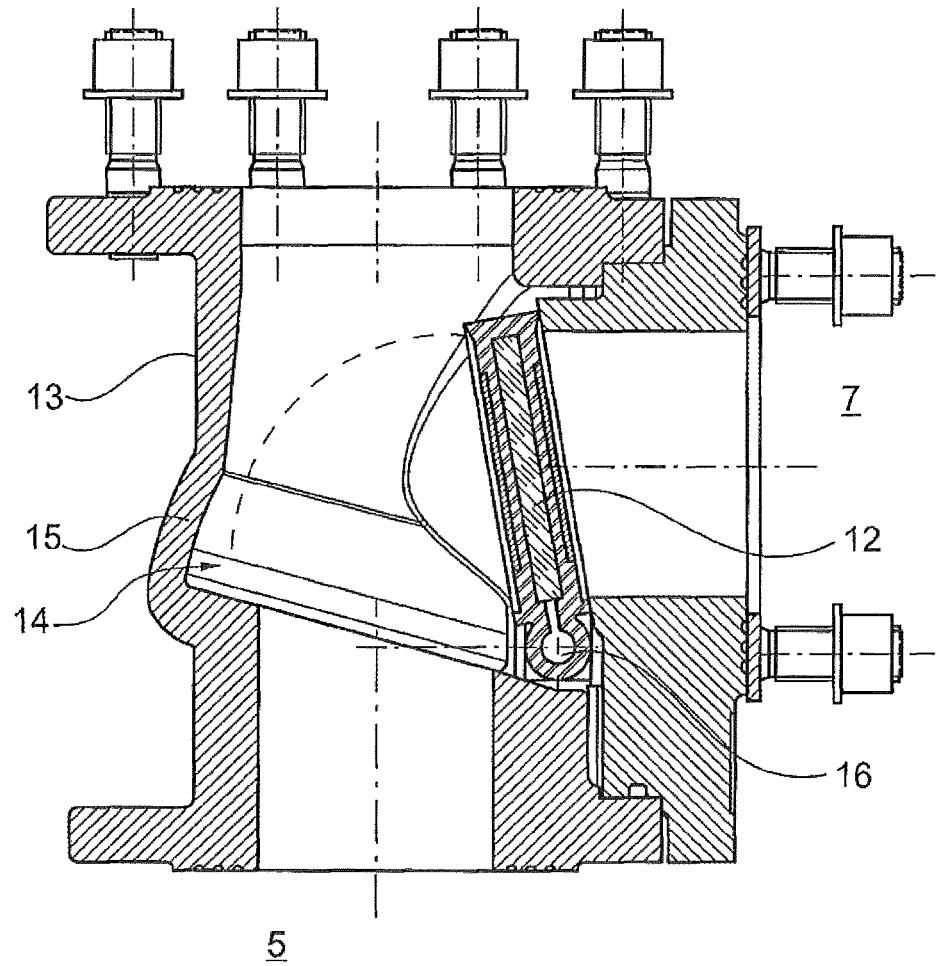
FIG. 4 shows the flap connector as per FIGS. 1-3 in section in a detail illustration.

The pivoting flap 12 is, without restriction, one which may have a metallic core and an outer plastic casing, as can be seen in FIG. 4. Moreover, in this context, the foot-side joint 16 ensures that the shut-off flap 12 can assume the positions illustrated in the comparison of FIGS. 2 and 3 without difficulty and without wear.

In fact, the shut-off flap or pivoting flap 12 is inclined in the connecting line 5 during the intake of wastewater illustrated in FIG. 2. Here, an angle α observed in this context of the inclination in relation to a horizontal H indicated in FIG. 2 can take values from approximately 10° to 30°. It can also be seen here that the pivoting flap 12 is limited in terms of its inclination with the aid of at least one stop. The stop may be an inner wall-side support ring for the pivoting flap 12 that is provided in the flap connector 13, as FIG. 4 in particular makes clear. Said support ring is realized in the region of or adjacent to the bulged portion 15. It can also be seen that the support ring, in conjunction with a lug-like projection on the bottom side of the pivoting flap 12, altogether specifies the flushing cross section 14 which is established. It goes without saying that other stops are also conceivable, provided that the flushing cross section 14 required during the intake of wastewater and necessary according to the invention remains as before.

Finally, within the context of the invention, the configuration is such that a wastewater flow associated with the wastewater intake and a pump flow associated with the pumping process are substantially equal in size. That is to say, the volume of inflowing wastewater during the intake of wastewater and the volume of the pumped pre-cleaned wastewater during the pumping process largely correspond. In the present case, this means that differences of less than 20% are observed between the two discussed and comparable volumes within a specified equal period of time, as has been described already in the introduction. This can be achieved and set without difficulty through the corresponding selection of the geometry of the connecting line 5, of the bypass line 7, of the pump 6 and also of the flap connector 13 and of the pivoting flap 12 as well as through selection of the pump 6 with corresponding throughflow cross section. As a consequence of this, according to the invention, in the interior of the liquid-collecting tank 8, there are observed practically no pressure peaks as in the prior art, and so the mechanical stability of said liquid-collecting tank is permanently increased.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a wastewater-lifting system in which wastewater laden with bulky materials, which are materials in the wastewater that are retained by at least one separating screen, is lifted and guided by a pump through a bulky material-collecting tank having the at least one separating screen arranged in the interior of the bulky material-collecting tank, comprising the steps of:
   during intake of the wastewater, retaining the bulky materials in the bulky material-collecting tank and feeding pre-cleaned wastewater from which the bulky materials have been removed via a connecting line to a liquid-collecting tank via one or both of the pump and a bypass line connected to the connecting line between the bulky material-collecting tank and the pump,
   wherein opposite ends of the connecting line and an end of the bypass line define a flap connector comprising a three-way bolted t-junction within which a pivoting flap is disposed,
   during the intake of the wastewater, closing a portion of the connecting line between the bypass line and the pump except for a flushing cross section configured to allow flushing flow around the pivoting flap toward the pump, and opens the bypass line to permit the pre-cleaned wastewater to flow to the liquid-collecting tank, and
   during a pumping process, closing the bypass line and opening the portion of the connecting line between the pump and the bypass line to permit the pump to pass the pre-cleaned wastewater from the liquid-collecting tank through the connecting line to the bulky material-collecting tank, wherein
   the flushing cross section is at least in part formed by a bulged portion that is defined by an outward curvature in a wall of the connecting line adjacent to the pivoting flap, the outward curvature being located adjacent to a free end of the pivoting flap, and
   the flushing cross section is established as an annular space or annular cross section, such that in a closed state of the pivoting flap, the pivoting flap is spaced apart from an inner wall of the flap connector.

2. The method as claimed in claim 1, wherein
   a flow rate of the wastewater laden with the bulky materials and a flow rate of the pre-cleaned wastewater generated by pump flow during the pumping process are substantially equal.

3. The method as claimed in claim 2, wherein
   a difference between the flow rate of the wastewater laden with the bulky materials and the flow rate of the pre-cleaned wastewater generated by the pump flow during the pumping process is less than 40%.

4. The method as claimed in claim 2, wherein
a difference between the flow rate of the wastewater laden with the bulky materials and the flow rate of the pre-cleaned wastewater generated by the pump flow during the pumping process is less than 20%.

5. The method as claimed in claim 1, wherein
the pivoting flap is connected to a flange of the bypass line, a flange of the connecting line, or to a flange of the flap connector arranged in the connecting line via a foot-side joint.

6. The method as claimed in claim 3, wherein
during the intake of the wastewater the pivoting flap is inclined in the connecting line at an angle which is not perpendicular to a direction of flow through the connecting line toward the pump.

7. The method as claimed in claim 6, wherein
the angle is 10° to 30° relative to a plane perpendicular to the direction of flow through the connecting line to the pump.

8. The method as claimed in claim 6, wherein
at least one stop limits the angle to not be perpendicular to the direction of flow through the connecting line to the pump.

9. The method as claimed in claim 1, wherein
when the pivoting flap is closed toward the pump except for allowing the flushing flow around the pivoting flap during the intake of the wastewater.

10. The method as claimed in claim 5, wherein
the pivoting flap is arranged in an interior of the flap connector.

11. The method as claimed in claim 1, further comprising: a pressure line, wherein pre-cleaned wastewater entrains solids retained in the bulky material-collecting tank and transfers the wastewater via the pressure line to a further system for further treatment.

12. The method as claimed in claim 1, further comprising: an inflow distributor, and a feed line, wherein an inflow 1 of the wastewater flows via the inflow distributor and the feed line, and transfers the wastewater into the bulky material-collecting tank out of two bulky material-collecting tanks.

13. A wastewater-lifting system, comprising:
a bulky material-collecting tank to receive wastewater laden with bulky materials, which are materials in the wastewater that are retained by at least one separating screen, and having the at least one separating screen arranged in the interior of the bulky material-collecting tank configured to retain the bulky material and allow flow of pre-cleaned wastewater separated from the bulky material out of the bulky material-collecting tank;
a pump for lifting the waste water, connected on one side to the bulky material-collecting tank via a connecting line and on an opposite side to a liquid-collecting tank;
a bypass line arranged between the connecting line and the liquid-collecting tank, the bypass line connecting to the connecting line between the bulky material-collecting tank and the pump; and
a pivoting flap that is disposed within a flap connector comprising a three-way bolted t-junction defined by opposite ends of the connecting line and an end of the bypass line,
wherein the wastewater-lifting system is configured such that
during intake of the wastewater, the pre-cleaned wastewater from the bulky material-collecting tank passes into the liquid-collecting tank via one or both of the pump and the bypass line, and the pivoting flap closes the connecting line at a location between the bypass line and the pump in a direction of the pump except for a flushing cross section configured to allow flushing flow around the pivoting flap toward the pump and opens the bypass line,
during a pumping process, the pre-cleaned wastewater being withdrawn from the liquid-collecting tank by the pump, opening the connecting line in a direction from the pump to the bulky material-collecting tank and closes the bypass line, wherein
the flushing cross section is at least in part formed by a bulged portion that is defined by an outward curvature in a wall of the connecting line adjacent to the pivoting flap, the outward curvature being located adjacent to a free end of the pivoting flap, and
the flushing cross section is established as an annular space or annular cross section, such that in a closed state of the pivoting flap, the pivoting flap is spaced apart from an inner wall of the flap connector.

14. The wastewater-lifting system as claimed in claim 13, wherein
the pivoting flap is connected to a flange of the bypass line, a flange of the connecting line, or to a flange of a flap connector arranged in the connecting line via a foot-side joint.

15. The wastewater-lifting system as claimed in claim 13, wherein
the pivoting flap is arranged in an interior of a flap connector.

16. The wastewater-lifting system as claimed in claim 13, wherein
when the pivoting flap is closed toward the pump except for allowing the flushing flow around the pivoting flap during the intake of the wastewater.

17. The wastewater-lifting system as claimed in claim 13, wherein
a flap connector is arranged in a 3-way connector in the connecting line, and the bypass line is connected to the 3-way connector via a branch.

18. The wastewater-lifting system as claimed in claim 13, further comprising: a pressure line, wherein pre-cleaned wastewater entrains solids retained in the bulky material-collecting tank and transfers the wastewater via the pressure line to a further system for further treatment.

19. The wastewater-lifting system as claimed in claim 13, further comprising: an inflow distributor, and a feed line, wherein an inflow of the wastewater flows via the inflow distributor and the feed line, and transfers the wastewater into the bulky material-collecting tank out of two bulky material-collecting tanks.

* * * * *